United States Patent
Babka et al.

(10) Patent No.: US 7,385,622 B2
(45) Date of Patent: Jun. 10, 2008

(54) METHOD AND SYSTEM FOR PRESENTING A VIDEO CALL MANAGEMENT CONSOLE

(75) Inventors: James J. Babka, Round Rock, TX (US); Jennifer W. McKibben, Austin, TX (US); Kirk A. Norsworthy, Austin, TX (US)

(73) Assignee: Tandberg Telecom AS, Lysaker (NO)

( * ) Notice: Subject to any disclaimer, the term of this patent is extended or adjusted under 35 U.S.C. 154(b) by 310 days.

(21) Appl. No.: 10/212,399

(22) Filed: Aug. 5, 2002

(65) Prior Publication Data

US 2003/0142201 A1 Jul. 31, 2003

Related U.S. Application Data

(60) Provisional application No. 60/353,743, filed on Jan. 31, 2002.

(51) Int. Cl.
*H04N 7/14* (2006.01)
(52) U.S. Cl. .............................. 348/14.09; 348/14.08; 370/260; 370/261; 715/736
(58) Field of Classification Search .. 348/14.01–14.09; 345/736, 835, 734, 440, 753; 379/93.17, 379/202.01, 201.01, 265.11, 266.01; 709/223, 709/224; 370/260, 261; 715/753, 762
See application file for complete search history.

(56) References Cited

U.S. PATENT DOCUMENTS

| | | | |
|---|---|---|---|
| 5,594,859 A | 1/1997 | Palmer et al. | |
| 5,619,684 A | 4/1997 | Goodwin et al. | |
| 5,642,156 A * | 6/1997 | Saiki | 348/14.09 |
| 5,644,628 A | 7/1997 | Schwarzer et al. | |
| 5,751,965 A | 5/1998 | Mayo et al. | |
| 5,831,666 A * | 11/1998 | Palmer et al. | 348/14.12 |
| 5,903,634 A * | 5/1999 | Wakabayashi et al. | 379/127.01 |
| 6,020,916 A * | 2/2000 | Gerszberg et al. | 348/14.07 |
| 6,044,260 A * | 3/2000 | Eaton et al. | 455/406 |
| 6,078,649 A * | 6/2000 | Small et al. | 379/39 |
| 6,192,118 B1 * | 2/2001 | Bayless et al. | 379/201.01 |
| 6,222,520 B1 | 4/2001 | Gerszberg et al. | |
| 6,259,355 B1 * | 7/2001 | Chaco et al. | 340/286.07 |
| 6,425,948 B1 * | 7/2002 | Nowak et al. | 106/31.15 |
| 6,608,559 B1 * | 8/2003 | Lemelson et al. | 340/539.13 |
| 6,687,234 B1 * | 2/2004 | Shaffer et al. | 370/260 |
| 6,873,617 B1 * | 3/2005 | Karras | 370/389 |
| 6,882,641 B1 * | 4/2005 | Gallick et al. | 370/356 |
| 2003/0081110 A1 * | 5/2003 | Lemieux et al. | 348/14.01 |

OTHER PUBLICATIONS

Rajala; Networking Monitoring Mrthod for Telecommunications Network; Apr. 22, 1999; WO 99/20034.*

* cited by examiner

*Primary Examiner*—Melur Ramakrishnaiah
(74) *Attorney, Agent, or Firm*—Oblon, Spivak, McClelland, Maier & Neustadt, P.C.

(57) ABSTRACT

Management information for plural video calls is presented through a user interface that displays a list of calls prioritized based on one or more parameters, such as alarms, so that the most important calls are prominently displayed as they need attention. An alarm tracker tracks alarms associated with video device parameters, such as jitter, latency and linearity, and an alarm priority module determines the priority of video calls for display by comparing the alarms associated with the video calls. In one embodiment, the user interface has a locking option to lock a call's display position, for instance when a particularly important call with a lesser number of alarms nonetheless has a need for closer monitoring.

7 Claims, 4 Drawing Sheets

METHOD AND SYSTEM FOR PRESENTING A VIDEO CALL MANAGEMENT CONSOLE

RELATED APPLICATIONS

This patent application claims priority from U.S. Provisional Patent Application Ser. No. 60/353,743, entitled "Presenting Video Conference Calls on a Management Consolte" and filed on Jan. 31, 2002 naming James Joseph Babka, Jennifer Wendy McKibben and Kirk A. Norsworthy as inventors.

BACKGROUND OF THE INVENTION

1. Field of the Invention

The present invention relates in general to the field of video conferencing, and more particularly to a method and system for presenting a video call management console.

2. Description of the Related Art

Video conferencing has grown in popularity, especially as a business tool, because it gives participants an opportunity to visually interact without having to travel to the same location. As a result, many businesses have made substantial investments in video networks, including endpoint, MCU, gateway and gatekeeper video devices that interact with each other through a network or that interact with other video devices through public networks, such as the Public Switched Telephone Network or the Internet. A typical business video network has a number of video devices geographically dispersed though out a number of locations and managed by a staff, such as information technology personnel. Further, as video conferencing by Internet Protocol has become more common, business video networks have migrated some video device functionality to modules running on servers and personal computers.

Active video network management is one important factor in whether a business is able to use its video network effectively. A video conference call between several video endpoints often presents a complex scheduling and configuration problem involving a number of video devices. Once video calls are scheduled and configured, participants who are unfamiliar with video endpoint operation generally ask for assistance in setting up and maintaining a video call. Further, if difficulties develop with video devices supporting a video call, back-up devices and reconfiguration of scheduled video calls may be needed. In short, video network administrators are busy and, with video networks that have a large number of video devices, often overwhelmed. In situations where a video call involves a particularly important member of a business or a particularly important subject matter, failures with video devices that lead to failures in the video call are often particularly embarrassing for the video network administrators.

SUMMARY OF THE INVENTION

Therefore a need has arisen for a method and system which aids in the effective monitoring of a video network to more easily detect problems, potential failures and failures of video calls.

A further need exists for a method and system which prioritizes the display of video calls in order of importance.

In accordance with the present invention, a method and system are provided which substantially reduce the disadvantages and problems associated with previous methods and systems for monitoring a video network. Video call parameters are analyzed to determine a priority associated with the video call, and the status of the video call is displayed in an order corresponding to the determined priority so that video calls with a higher priority are more prominently displayed for monitoring. For instance, the number of alarms for endpoints of plural video calls is compared to identify the priority video calls for monitoring as those facing a greater threat of failure. The status of the video calls is presented in a list with the video calls having the greater number of alarms presented in the most prominent priority position of the list and the remaining video calls presented in descending order of priority.

More specifically, a video device management platform monitors a video network to track alarms of video devices in active video calls. The alarms are compared quantitatively and qualitatively to determine the priority of video calls for display. For instance, video calls are prioritized with the number of alarms for the video devices of a video call compared between video calls and the priority for each video call assigned based on the number of alarms in descending order with the highest number of alarms having the highest priority. In addition, the seriousness of each alarm is evaluated and weighted variably so that a more serious alarm has a greater impact on the priority of its associated video call than does a less serious alarm. In one embodiment, video calls are selectively locked into a display position to override the alarm priority so that the locked video call is readily available for monitoring.

A video-calls-in-progress user interface displays a list of active video calls with the list ordered so that calls associated with one or more preselected parameters are more prominently displayed. For instance, the user interface displays a tabular list of active video calls with the order based on the priority assigned from the monitoring of video call alarms. The calls with the greatest number of alarms are displayed as the most important in need of monitoring while less important calls having less alarms are available for monitoring lower in the list. If the number of video calls in the list exceeds the display space available for the list, the higher priority video calls are displayed in the display space and the lower priority video call are hidden but available for monitoring by scrolling down the ordered list.

The present invention provides a number of important technical advantages. One example of an important technical advantage is that a user interface aids in the effective monitoring of a video network to more easily detect problems, potential failures and failures of video calls by prioritizing the display of active video calls to more prominently display video calls associated with problems as reflected by a greater number of alarms. The display of video call information in order of priority aids an administrator in monitoring a large number of video calls by presenting calls with greater difficulties immediately in the administrator's view while making calls with less difficulties available for viewing by scrolling down the list. The relative importance of the video calls is updated as the calls proceed, as calls are completed and as new calls are added.

Another example of an important technical advantage of the present invention is that it prioritizes the display of video calls in order of importance and allows an administrator to assign a higher importance to selected calls independent of call status. For instance, an administrator locks the display position of one or more video calls associated with a particularly important individual or subject matter so that the administrator may more easily monitor the status of the locked video calls. Thus, calls involving important individuals and/or important subject matter may be more closely monitored for potential problems.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Effective management of a video network typically calls for monitoring of active video calls so that problems are identified and corrected in a prompt manner with as little interference as possible with video network operations. Many video networks are complex and have a great number video devices, including video endpoints that display a video call to participants and capture the participants to send to other endpoint as video calls. In such networks, the number of active video calls may exceed the number that may be displayed in available display space so that an administrator who is monitoring the video network is unable to simultaneously view all video calls to monitor for problems. The present invention aids the monitoring of a video network by prioritizing the video calls to display management information more prominently for priority calls. For instance, alarms associated with endpoints of video calls are periodically compared to determine the video calls having the greatest need for monitoring. The video calls are then presented on the display in order of priority with those endpoints having a greater need for monitoring biased towards the top of the list. In this manner, an administrator may monitor a video network with problem video calls shown in the display space as they need attention and normal calls hidden if display space is not available.

Figure 1:
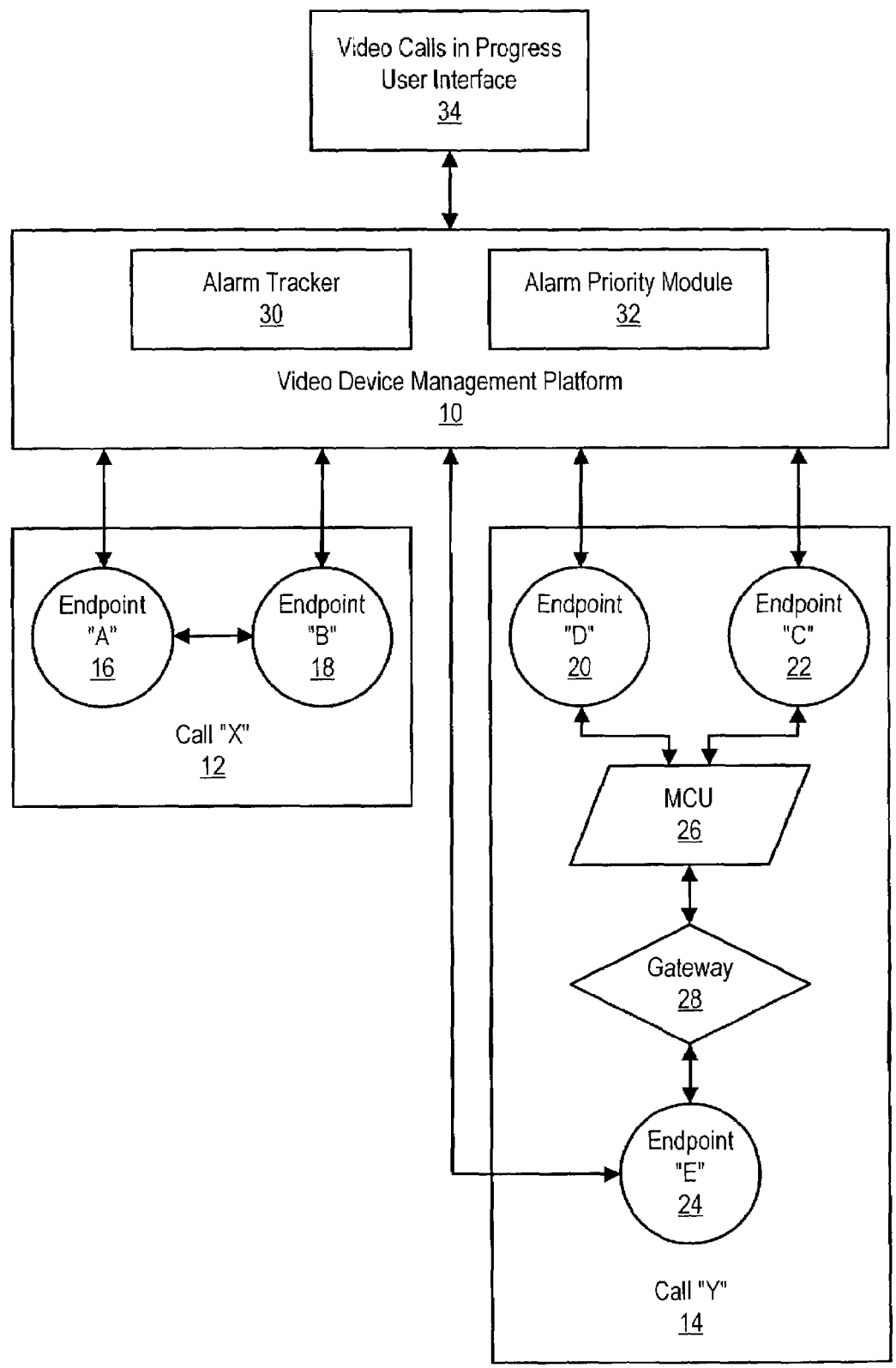
FIG. 1 depicts a block diagram of a video call management platform managing plural video calls.

Referring now to FIG. 1, a block diagram depicts a video device management platform 10 that manages a video network by communicating with video devices and collecting management information for the video devices. Management platform 10 is monitoring a call "X" 12 and a call "Y" 14 by collecting call statistics for the endpoints of the calls. Call "X" 12 is directly between an endpoint "A" 16 and an endpoint "B" 18. Call "Y" is a three-way call between endpoint "D" 20, endpoint "C" 22 and endpoint "E" 24 that is supported by an MCU 26 and gateway 28. Video calls may involve endpoints or other video devices outside of the direct control of management platform 10, such as when a video call is made by an endpoint to a destination outside of the direct video network, so the amount of management information available for various video devices may vary.

Video device management platform 10 includes an alarm tracker 30 and an alarm priority module 32 to track and display video call statistics on a video-calls-in-progress user interface 34. Management platform 10 communicates with video devices associated with a video, such as endpoints, MCUs and gateways, to collect video device management information, including video call statistics. Alarm tracker 30 collects video call alarm statistics, such as alarms detected at video endpoints for linearity, jitter and latency. Alarm tracker 30 tracks the type, number, time and rate of alarms for each endpoint in a video call as the alarm statistics are collected through management platform 10. Alarm priority module 32 determines the priority of the video calls for display by comparing the alarms associated with each video call. Video-calls-in-progress user interface 34 displays the status of the video calls in an ordered list corresponding to the priority determined by priority module 32. In alternative embodiments, information for individual video endpoints or other types of video devices may be displayed, such as gateways, gatekeepers and MCUs, and statistics other than or in addition to alarms may be used to determine display priority.

Figure 2:
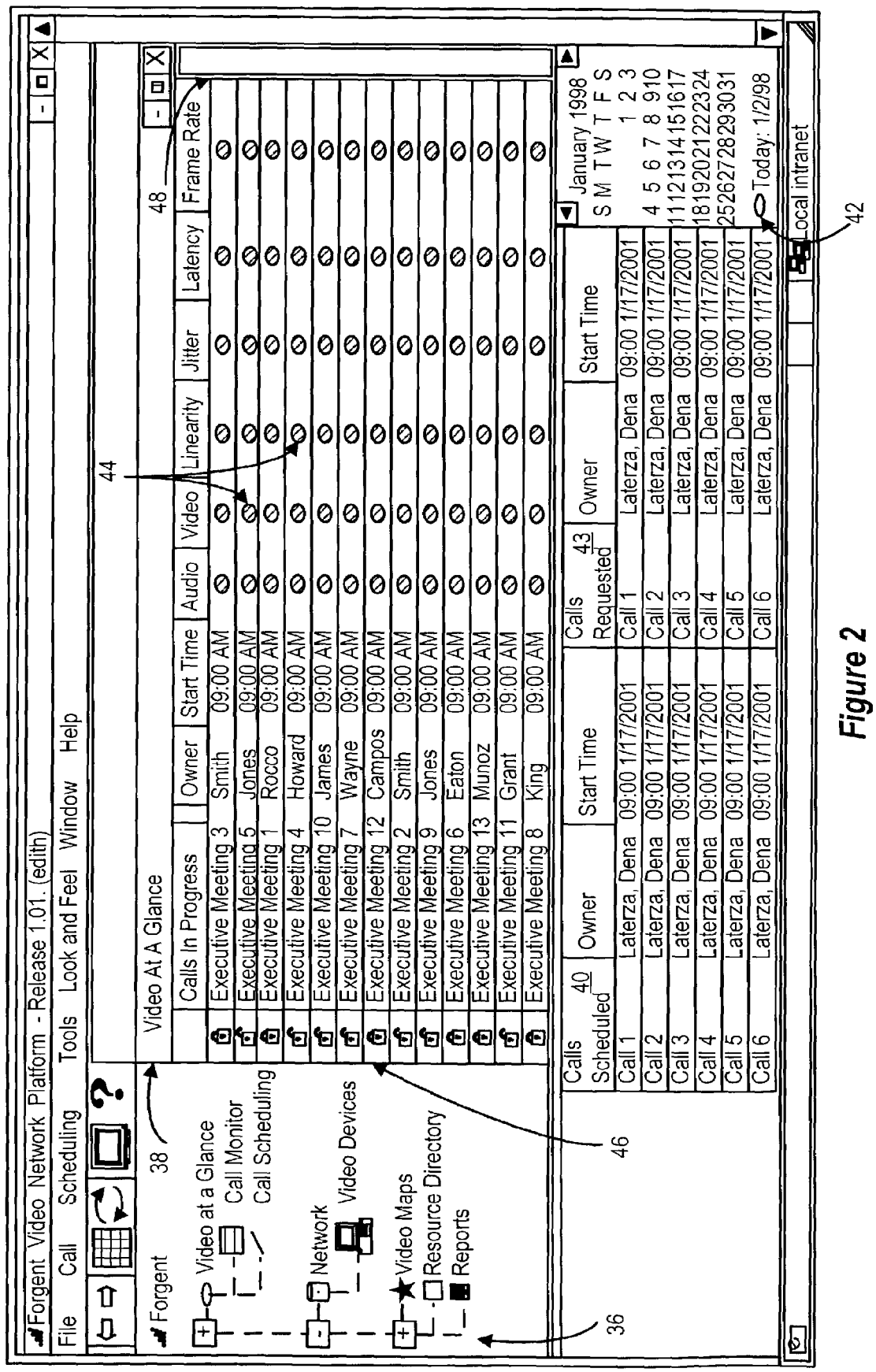
FIG. 2 depicts a user interface for presenting video call management information.

FIG. 2 depicts an example of a video-calls-in-progress user interface 34 that displays management information for video devices performing video calls. A user interface tree window 36 depicts the information available from the user interface, including a video-at-a-glance node having a leaf to monitor video calls in progress and another leaf to view video call scheduling. A video-calls-in-progress window 38 displays a tabular list of each video call up to a maximum number of video calls that are presentable in the defined display space for the window, a total of 13 video calls in the example depicted by FIG. 2. A call-scheduling window 40 displays scheduled video calls for the day selected from a calendar 42, and a call requests window 43 displays a list of all the outstanding call requests in order of their creation.

Video-calls-in-progress user interface 34 is designed to present information to a video network administrator in an intelligible and meaningful manner by displaying more prominently to the administrator those video calls of greater importance and less prominently those video calls of lesser importance. The relative importance of video calls may be based on a number of video call parameters and methods of determining importance, however the example user interface depicted by FIG. 2 lists video calls in order of importance based on likelihood of failure with the video calls that are more likely to fail having greater importance than video calls that are less likely to fail. Video-calls-in progress window 38 displays alarm statistics from each video call, including audio, video, linearity, jitter, latency and frame rate alarm statistics, with indicator lights 44. For example, a green indicator light indicates that a statistic is within bounds, a yellow indicator light indicates that a statistic is slightly out of bounds, and a red indicator light indicates that a statistic is seriously out of bounds. The statistic that determines a color for an indicator light may be based on the worst measured statistic associated with a single device of the call, by the total of the statistics of the devices associated with a call, or by an average value computed by dividing the total of the statistics by the number of devices associated with the video call.

Once alarm priority module 32 determines the relative importance of each video call, calls-in-progress window 38 displays the video calls in order of importance until the display space of calls-in-progress window 38 is used. The video calls that are not displayed due to their location down the list of calls may be selected for viewing by scrolling down the list of video calls with scroll bar 48. In one embodiment, the location of a video call in calls in progress window 38 is selectively locked by clicking on a lock icon 46 so that a locked video call will remain in the same position in the display list. Locking of a position for a video call prevents the selected video call from leaving the display if its relative level of importance decreases or if the scroll bar is used to see lower-priority calls. Locking of a position for a video call also allows selectively closer management of video calls deemed important for reasons other than the parameters analyzed by alarm priority module 32. For instance, if an important executive schedules a call, an administrator may elect to lock the executive's call into a high priority position to monitor the call more closely even if the call runs smoothly and without alarms.

Figure 3:
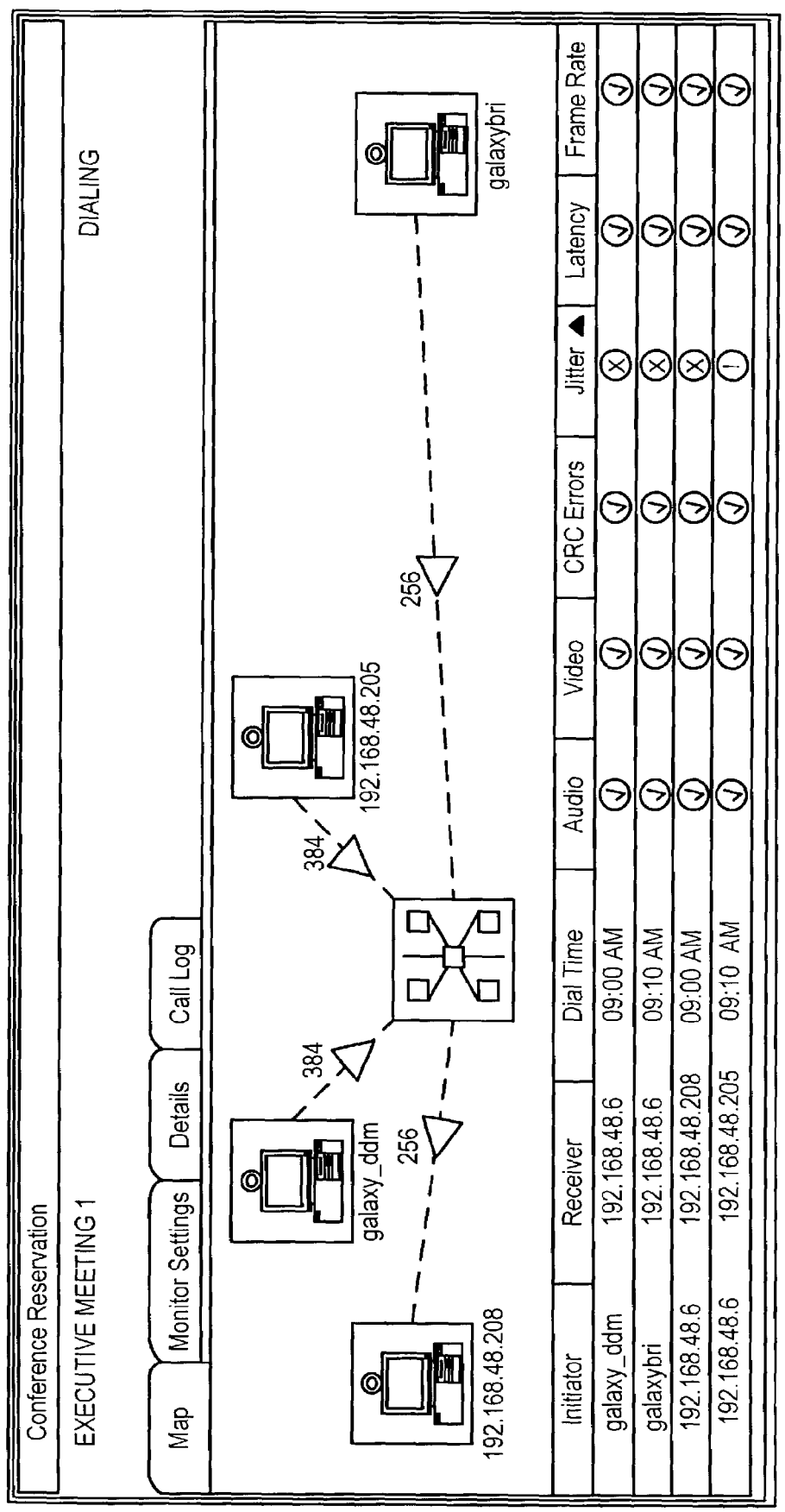
FIG. 3 depicts a user interface for presenting video devices associated with a selected video call.

Referring now to FIG. 3, a user interface is depicted that shows a video call configuration for a video call selected from the video-calls-in-progress window 38. For instance, if an administrator wishes to view the particulars of a video call from the video call list, double clicking the video call of interest brings up a user interface as depicted by FIG. 3 which shows the individual video devices involved in the video call along with the statistics of the individual devices. In one alternative embodiment, individual video devices may be listed in video-calls-in-progress window 38.

Figure 4:
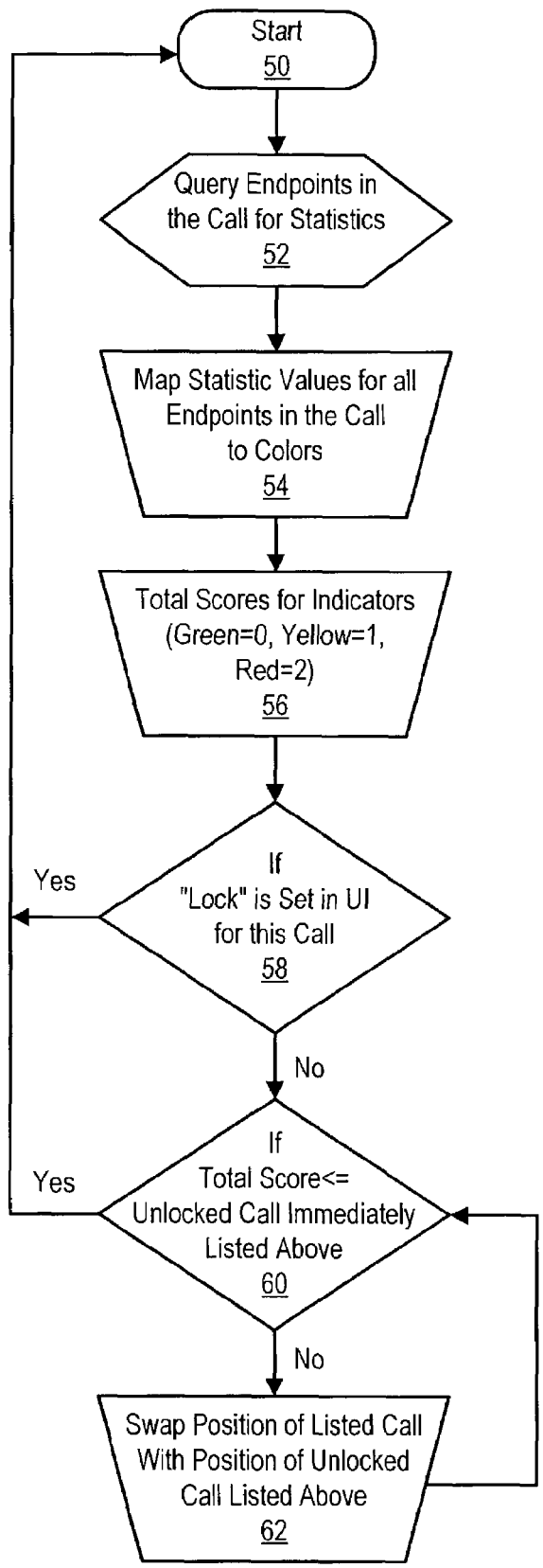
FIG. 4 depicts a flow diagram for comparing video call parameters.

Referring now to FIG. 4, a flow diagram depicts one example of a comparison of parameters for video calls to analyze the relative display importance of the video calls. The process begins at step 50 and periodically repeats for each currently active video call. At step 52, the endpoints in a video call are queried for video call statistics by alarm tracker 30 of video device management platform 10. In alternative embodiments, statistics for other video devices may also be used. At step 54, the video call statistic values are mapped by alarm tracker 30 to colors for indicator lights 44 corresponding to the statistic and endpoint video call. At step 56, total scores for the endpoint video calls are determined by alarm priority module 32 by weighting the indicator lights according to importance and adding the weighted indicators for a total score for each endpoint and each video call.

As an example, video call "X" and video call "Y" depicted by FIG. 1 will initially each have a total score of zero with all indicator lights green. As the video calls progress, alarm tracker 30 at step 52 periodically queries the endpoints of calls X and Y for call statistics and tracks any alarms that occur. During one query, endpoint A of call X returns a call statistic that, at step 54, maps to a value indicating that the call statistic is slightly out of bounds. The slightly out of bounds value is assigned a yellow color and a score of 1. Endpoint D of call Y returns a call statistic that, at step 54, maps to a value indicating that the call statistic is seriously out of bounds. The seriously out of bounds value is assigned a red color and a score of 2. At step 56, the total scores for each active video call are determined by adding the scores of the endpoints of each video call. Thus, in the present example, call X has a value of 1 and call Y has a value 2. The different values assigned to the different colors allow a weighting of the relative importance of the various call statistics. In alternative embodiments, the relative importance of video calls may be determined by different weights or different parameters. For instance, the currency of alarms may be used by comparing the number of alarms detected in a preceding time period or by comparing the rate of alarms by detecting the number of alarms in predefined time periods. In another alternative embodiment, each endpoint video call may be considered separately by determining a total value of the scores for each endpoint.

At step 58, a determination is made of whether a lock is set for the video call. A lock is a manual selection that ensures that a video call will stay in a defined position in the display to make the monitoring of the video call more predictable. In one embodiment, a lock places a video call in the highest unlocked priority position available in the display. In an alternative embodiment, a lock maintains a video call in its current display position. If, at step 58, the determination is yes a lock is set, the process returns to step 50 and the video call is placed in the appropriate locked position. Note that the position of the locked calls will affect how the comparison of unlocked calls is accomplished. For instance, if locked calls are moved to a position of the highest priority or to a separate window, the locked calls will not be compared with unlocked calls. If locked calls remain in the same position, then an instruction prevents comparison of locked calls as described below so that the score for an unlocked call is compared against the score of the next highest unlocked call to determine the display position of the unlocked call.

If the determination at step 58 is no, a lock is not set and the process continues to step 60 where the total score for the video call is compared with the total score of the video call immediately listed above that is not locked. If the total score for the video call is less than or equal to the unlocked video call listed immediately above, the video call's position remains unchanged and the process returns to step 50. If the total score for the video call is greater than the unlocked video call listed immediately above, then at step 62 the video call swaps positions with the video call immediately above and the process returns to step 60 to repeat the comparison. The comparison of step 60 and swap of step 62 reiterate until the video call reaches a position in the list at which the video call has the same or a greater score than the video call listed immediately above. The process then returns to step 50 to start with the next video call.

The display position of locked video calls may be implemented so that scrolling of the video calls list will not affect the display position of the locked calls. For instance, if an administrator scrolls down the list of video calls to view lower priority video calls, the movement of the scroll bar leaves the position of locked calls unchanged while scrolling through unlocked video calls so that the locked calls remain displayed. A scroll list with selected locked entries that do not scroll with the unlocked entries is implemented, for instance, using a Java ScrollPane and Java Scrollbar that communicate with a scroll listening module. The scroll listening module detects scroll events, determines the number of positions the list is moving in the scroll pane, and then changes the order of the data in the scroll list such that all locked items are moved up or down in the list the same number of positions as the scroll event indicates, but in the opposite direction. For example, if the scroll listener determines that the list is moving down in three places, then all the locked entries would be moved up three places in the list. Although selective locking of scroll lists is described in the context of monitoring a video call list, the scope of the invention includes other types of user interfaces that display lists.

Although the present invention has been described in detail, it should be understood that various changes, substitutions and alterations can be made hereto without departing from the spirit and scope of the invention as defined by the appended claims.

What is claimed is:

1. A system for presenting a video call management information, the system comprising:
   a video device management platform interfaced with plural video devices, the video devices communicating in one or more video calls;
   an alarm tracker associated with the video management platform and operable to track alarms associated with the video calls; and
   an alarm priority module in communication with the alarm tracker, the alarm priority module operable to determine the priority of the video calls for display by comparing the alarms associated with the video calls.

2. The system of claim 1 further comprising a display in communication with the alarm priority module and operable to present a list of the video calls in the order of priority determined by the alarm priority module.

3. The system of claim 2 wherein the display presents a call lock operable to set the order of display of one or more video calls.

4. The system of claim 3 wherein the call lock sets the order of display of a selected video call as the order existing at the time of selection of the call lock for the selected video call.

5. The system of claim 3 wherein the call lock sets the order of display of one or more selected video calls as the order associated with the highest priority.

6. The system of claim 1 wherein the alarm priority module compares the number of alarms associated with each video call.

7. The system of claim 1 wherein the alarm priority module compares the rate of alarms associated with each video call.

* * * * *